(12) United States Patent
Woods

(10) Patent No.: US 10,759,651 B2
(45) Date of Patent: Sep. 1, 2020

(54) FUEL PUMP HANDLE RETAINING DEVICE

(71) Applicant: Daniel Patrick Woods, Coeur d'Alene, ID (US)

(72) Inventor: Daniel Patrick Woods, Coeur d'Alene, ID (US)

(73) Assignee: Daniel Woods, Coeur d'Alene, ID (US)

( * ) Notice: Subject to any disclaimer, the term of this patent is extended or adjusted under 35 U.S.C. 154(b) by 31 days.

(21) Appl. No.: 16/159,688

(22) Filed: Oct. 14, 2018

(65) Prior Publication Data

US 2020/0115216 A1   Apr. 16, 2020

(51) Int. Cl.
- *B67D 7/06* (2010.01)
- *F16B 2/22* (2006.01)
- *B60S 5/02* (2006.01)

(52) U.S. Cl.
CPC .................. *B67D 7/06* (2013.01); *F16B 2/22* (2013.01); *B60S 5/02* (2013.01)

(58) Field of Classification Search
CPC ... B67D 7/06; B67D 7/42; B67D 7/50; B67D 2007/0411; B67D 2007/0409; B60S 5/02; F16B 2/22

USPC .......................................................... 141/392
See application file for complete search history.

(56) References Cited

U.S. PATENT DOCUMENTS

| | | | | |
|---|---|---|---|---|
| 1,592,556 A | * | 7/1926 | Canaan, Jr. ............ | A62C 31/28 248/78 |
| 3,291,165 A | * | 12/1966 | Fraylick ................. | B67D 7/421 141/286 |
| 3,431,947 A | * | 3/1969 | Hines ...................... | F16L 3/003 138/106 |
| 3,759,423 A | * | 9/1973 | Hansel .................... | B67D 7/423 222/153.01 |
| 7,581,570 B1 | * | 9/2009 | Lamke ..................... | B67D 7/42 141/1 |
| 8,066,068 B2 | * | 11/2011 | Lesko .................... | C09K 8/665 166/280.2 |

* cited by examiner

*Primary Examiner* — Timothy L Maust

(57) ABSTRACT

A removable fuel handle retainer is provided, comprising: a circular bungee strap, of a size to fit snugly around the neck of the fuel tank opening on a semi truck; a "U" shaped bungee strap or stirrup of the same material, molded of a piece with the circular bungee strap; and a circular bungee finger hole, molded of a piece with the "U" shaped bungee strap or stirrup, of the same material, at the apex of the "U" shaped bungee strap or stirrup to be used for leverage when activating the device.

2 Claims, 3 Drawing Sheets

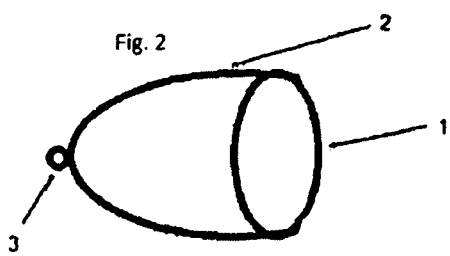
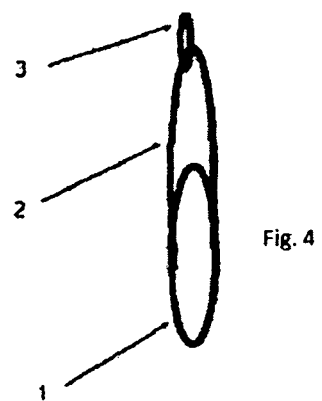
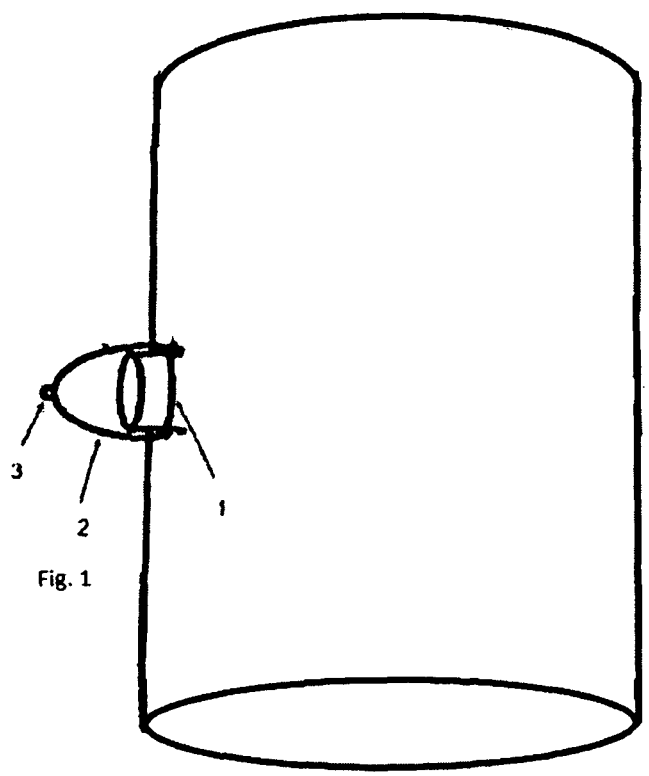
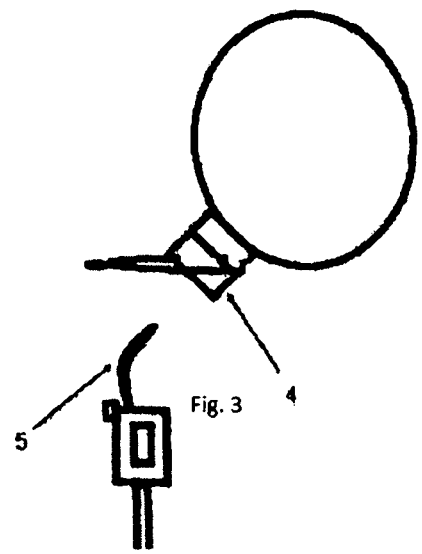

FUEL PUMP HANDLE RETAINING DEVICE

TECHNICAL FIELD

The present invention relates generally to fueling over-the-road tractor trucks and, in particular, to a removable retainer for securing a fueling hose nozzle in the fill tube opening of a fuel tank. The retainer is designed for use on heavy-duty semi trucks with multiple diesel fuel tanks and allows simultaneous fueling of all tanks without the risk of the fuel nozzles falling out of the fuel tanks during fueling. The retainer can be left in place on the tank, with the fuel cap screwed back in place, and lies flat and out of the way against the tank when not in use.

BACKGROUND ART

Over-the-road tractor trucks may have one or two diesel fuel tanks with a combined capacity of 100 to 300 gallons. Because of the angle of the fuel tank opening on many trucks and the resulting imbalance of the fuel hose and nozzle, because of the pressure of the fuel being dispensed from the hose nozzle, and because the pressure can change suddenly, it is possible for the nozzle to be forced out of the tank opening, resulting in a fuel spill and an inconvenient and unsafe condition. Consequently, it is important to keep the nozzle in the opening. While the driver may stand by each fuel tank and hold each hose handle only filling one fuel tank at a time, filling even one tank may take a quite a bit of time while filling two and possibly three tanks may take as long as 30 minutes. It is standard practice for the truck driver to be performing other important tasks, such as washing windows, checking tires, and topping off fluids while the tanks are filling. These tasks require several minutes of extra time if the drive had to hold each fuel hose handle one at a time. Importantly, a driver holding the fuel nozzle while filling the tanks is exposed to toxic diesel fumes, which is substantially avoided if the driver is even several feet from the opening of the tank while performing the other tasks.

A method some drivers use to secure the pump handle, illustrated in FIGS. 5 and 6, is to secure the nozzle in the tank's opening with a bungee cord wrapped through or around the handle. In FIG. 5, the ends of the bungee cord are hooked into openings in the step of the truck with the bungee cord passing over the handle. In FIG. 6, the bungee cord is wrapped around a portion of the handle and the ends are hooked to an edge above the tank opening. However, attaching the bungee cord may be difficult and it may not be secure enough or may break or slip, causing the nozzle to fall out of the tank opening and spilling fuel. And the bungee cord, if left hooked on the steps when not in use, can cause trips, slips and falls when climbing into and out of the cab.

SUMMARY OF THE INVENTION

Embodiments of the present invention provide a removable fuel handle retainer, comprising: a circular bungee strap (1), of a size to fit snugly around the neck (4) of the fuel tank opening on a semi truck; a "U" shaped bungee strap or stirrup (2) of the same material, being integral with the circular bungee strap (1); and a circular bungee finger hole (3), being integral with the "U" shaped bungee strap or stirrup (2), of the same material, at the apex of the "U" shaped bungee strap (1) or stirrup to be used for leverage when activating the device.

A driver secures the fuel handle retainer to the semi truck by stretching the circular bungee strap (1) around the neck (4) of the fuel tank opening, after removing the cap. The driver may then place the nozzle (5) in the opening and stretch the "U" shaped bungee strap or stirrup (2) over the knob on top of the fuel pump handle. The tension of the "U" shaped bungee strap or stirrup (2), being integral with the circular bungee strap (1), keeps the nozzle (5) from moving backward and slipping out of the tank opening. The fuel handle retainer may be left stretched around the tank opening and will lie flat against the tank and out of the way with the fuel tank cap replaced after fueling.

BRIEF DESCRIPTION OF THE DRAWINGS

FIG. 1 illustrates a front view of a fuel tank with the invention in place, with the circular part stretched around the neck of the fuel tank opening.

FIG. 2 illustrates a front view of the invention alone.

FIG. 3 illustrates a side view of a fuel tank with the invention in place. The nozzle goes into the opening, and the "U" shaped bungee strap or stirrup is stretched over the knob on top of the fuel pump handle.

FIG. 4 illustrates a slight side view of the invention, which lies flat and out of the way against the tank when not stretched into place over the knob on top of a fuel pump handle.

DETAILED DESCRIPTION OF THE PREFERRED EMBODIMENT

Figure 5:
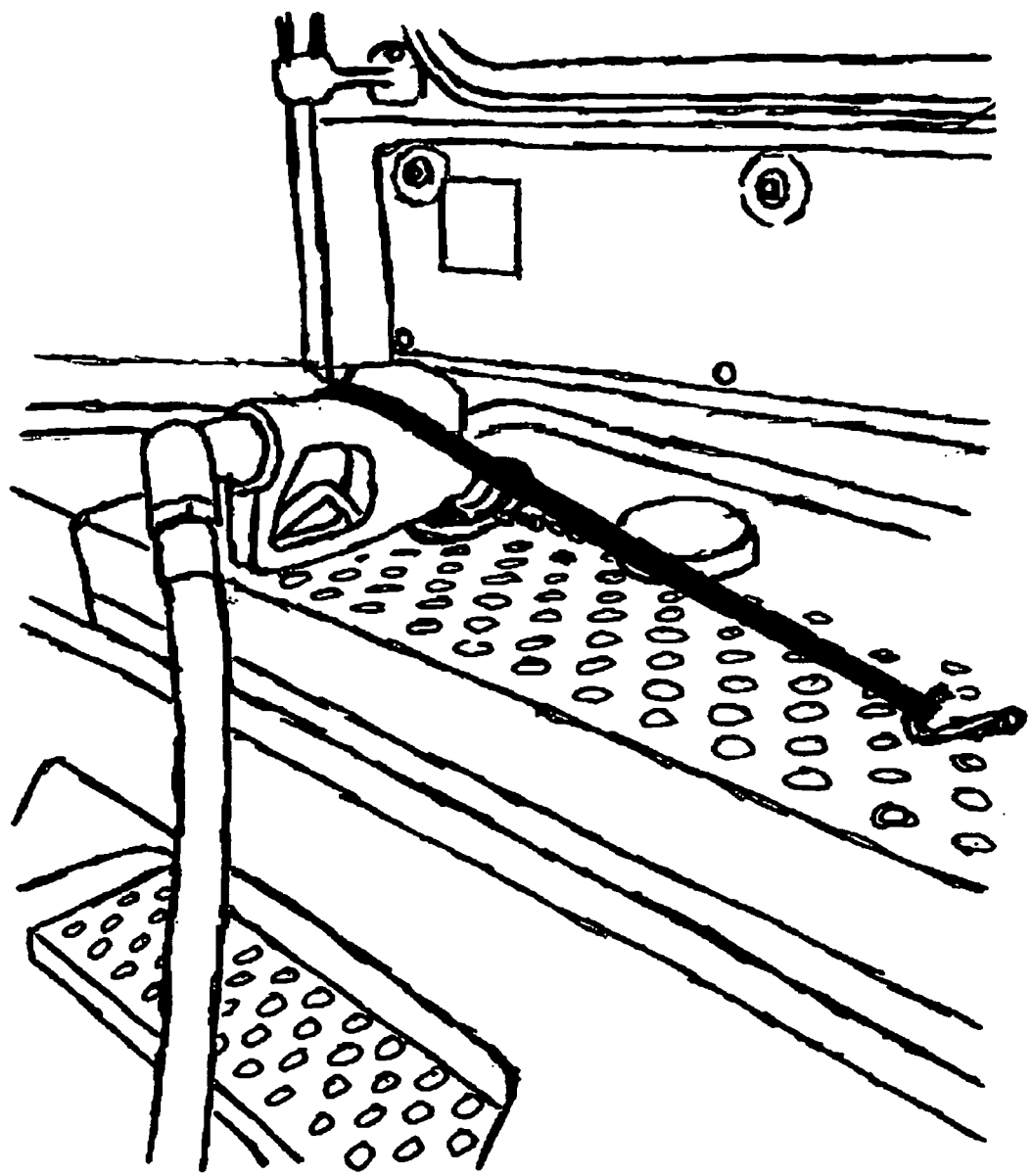
FIG. 5 illustrates prior art of a bungee cord stretched over a fuel pump handle and hooked through holes in the top step.
Figure 6:
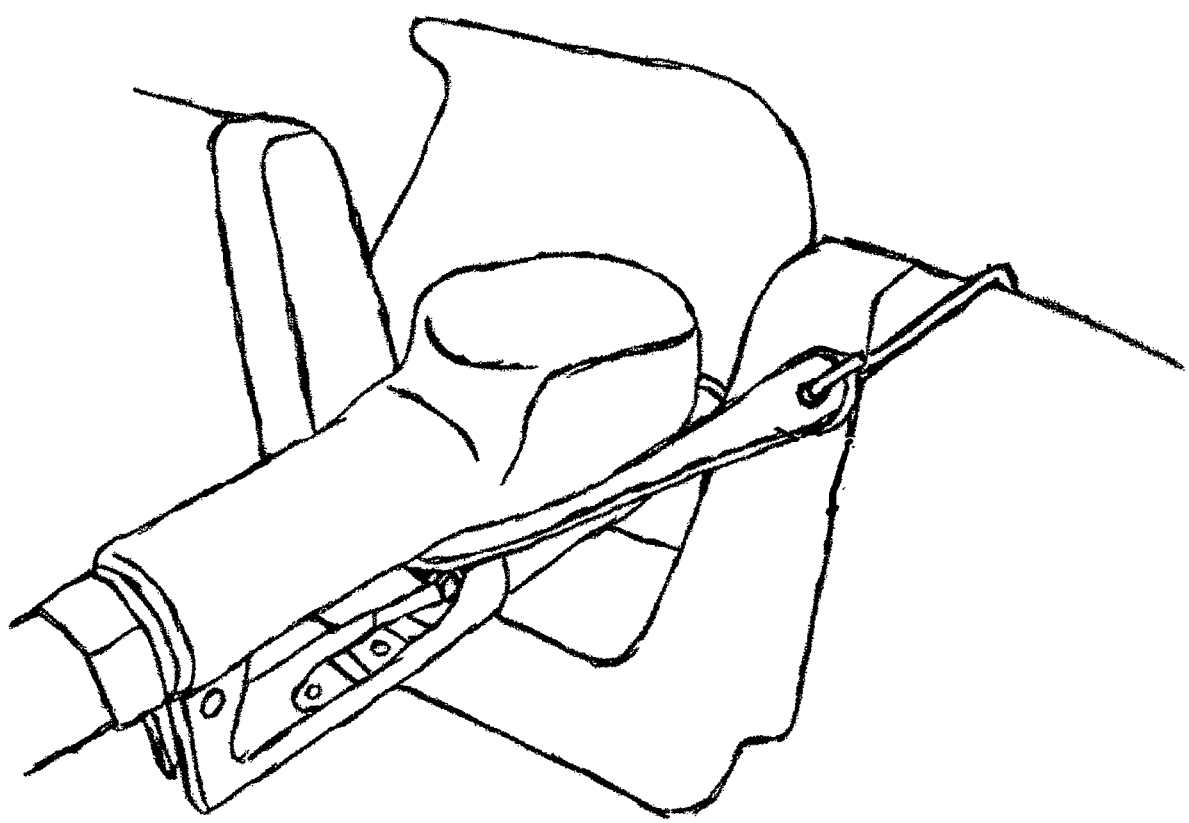
FIG. 6 illustrates prior art of a bungee cord threaded through the fuel pump handle.

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

FIG. 4 illustrates an embodiment of a removable device for securing a fueling hose nozzle (5) in a diesel fuel tank opening. The device includes a circular bungee strap (1); a "U" shaped bungee strap or stirrup (2); and a circular finger hole (3). All molded of a piece, that lies flat and out of the way against the fuel tank when not in use.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of using a fuel handle retainer to secure a fuel hose nozzle in a fuel tank opening of a semi truck fuel tank, the method comprising the steps of:

stretching the circular bungee strap around a neck of the fuel tank opening;

placing the fuel hose nozzle into the fill tube opening;

stretching a "U" shaped bungee strap or stirrup over a knob on top of a fuel hose handle;
beginning the flow of fuel; and
whereby:
  the "U" shaped bungee strap or stirrup, being integral with the circular bungee strap prevents the fuel hose handle from moving backwards away from the fill tube opening.

2. A removable fuel handle retainer, comprising:
a circular bungee strap, of a size adapted to fit snugly around a neck of a fuel tank opening on a semi truck;
a "U" shaped bungee strap or stirrup of the same material, being integral with the circular bungee strap;
a circular bungee finger hole, being integral with the "U" shaped bungee strap or stirrup, of the same material, positioned at the apex of the "U" shaped bungee strap or stirrup; whereby stretching the circular bungee strap around the neck of the fuel tank opening; placing the fuel hose nozzle into the fuel tank opening; stretching the "U" shaped bungee strap or stirrup over a knob on top of the fuel handle; and beginning the flow of fuel prevents the fuel handle from moving backwards away from the fuel tank opening.

* * * * *